United States Patent
Irie

(10) Patent No.: US 9,740,934 B2
(45) Date of Patent: Aug. 22, 2017

(54) IMAGE RECOGNITION DEVICE AND METHOD FOR REGISTERING FEATURE DATA IN IMAGE RECOGNITION DEVICE

(71) Applicant: OMRON Corporation, Kyoto-shi, Kyoto (JP)

(72) Inventor: Atsushi Irie, Nara (JP)

(73) Assignee: OMRON Corporation, Kyoto (JP)

( * ) Notice: Subject to any disclaimer, the term of this patent is extended or adjusted under 35 U.S.C. 154(b) by 49 days.

(21) Appl. No.: 14/725,411

(22) Filed: May 29, 2015

(65) Prior Publication Data

US 2015/0363642 A1 Dec. 17, 2015

(30) Foreign Application Priority Data

Jun. 12, 2014 (JP) ................. 2014-121908

(51) Int. Cl.
| | | |
|---|---|---|
| *G06K 9/00* | (2006.01) | |
| *G06K 9/62* | (2006.01) | |
| *G06F 17/30* | (2006.01) | |
| *G06K 9/46* | (2006.01) | |
| *G06T 7/30* | (2017.01) | |

(52) U.S. Cl.
CPC ... *G06K 9/00624* (2013.01); *G06F 17/30247* (2013.01); *G06K 9/00295* (2013.01); *G06K 9/00926* (2013.01); *G06K 9/4604* (2013.01); *G06K 9/6222* (2013.01); *G06K 9/6263* (2013.01); *G06T 7/30* (2017.01)

(58) Field of Classification Search
CPC .............................. H04L 7/042; G06K 9/6222
See application file for complete search history.

(56) References Cited

U.S. PATENT DOCUMENTS

| | | | |
|---|---|---|---|
| 2002/0136433 A1* | 9/2002 | Lin ................. | G06K 9/00295 |
| | | | 382/118 |
| 2004/0086157 A1 | 5/2004 | Sukegawa | |

(Continued)

FOREIGN PATENT DOCUMENTS

| | | |
|---|---|---|
| JP | 2008-077536 A | 4/2008 |
| KR | 2004-0038617 A | 5/2004 |

(Continued)

OTHER PUBLICATIONS

Office Action in counterpart Korean Patent Application No. 10-2015-0073698 issued Oct. 4, 2016 (13 pages).

(Continued)

*Primary Examiner* — Oneal R Mistry
(74) *Attorney, Agent, or Firm* — Osha Liang LLP

(57) ABSTRACT

An image recognition device has a database in which pieces of feature data of a plurality of objects are registered while divided into classes for each of the plurality of objects; an identification unit that identifies an unknown object by evaluating which feature data of the class registered in the database is most similar to feature data obtained from an image of the unknown object, and a feature data registration unit that registers feature data in the database. The database is capable of setting a plurality of classes to an identical object. The feature data registration unit, in adding new feature data with respect to a first object already registered in the database, sets a new class other than an existing class with respect to the first object.

6 Claims, 8 Drawing Sheets

(56) References Cited

U.S. PATENT DOCUMENTS

| | | | |
|---|---|---|---|
| 2005/0066180 A1* | 3/2005 | Watanabe | G07C 9/00158 713/186 |
| 2010/0066822 A1* | 3/2010 | Steinberg | G06K 9/00208 348/77 |
| 2010/0316265 A1* | 12/2010 | Nakanowatari | G06K 9/00288 382/118 |
| 2013/0243328 A1* | 9/2013 | Irie | G06K 9/46 382/192 |
| 2014/0226877 A1 | 8/2014 | Je et al. | |

FOREIGN PATENT DOCUMENTS

| | | |
|---|---|---|
| KR | 10-1180471 B1 | 9/2012 |
| KR | 2013/0105285 A | 9/2013 |
| WO | 2013/093173 A1 | 6/2013 |

OTHER PUBLICATIONS

Extended European Search Report issued in corresponding European Patent Application 15169262.1 dated Nov. 4, 2015 (6 pages).
George S. Sebestyen: "Decision-Making Processes in Pattern Recognition", Jan. 1, 1962 (Jan. 1, 1962), The Macmillan Company, New York, XP002747334, pp. 91-93 (5 pages).

* cited by examiner

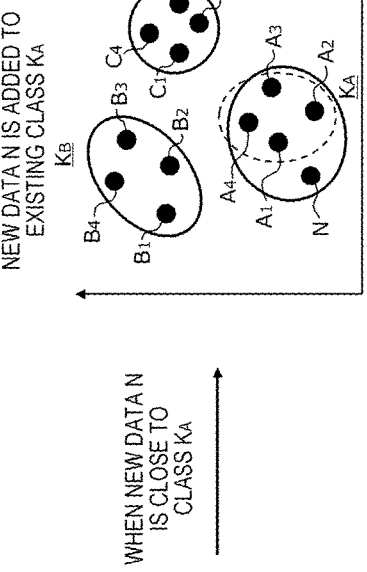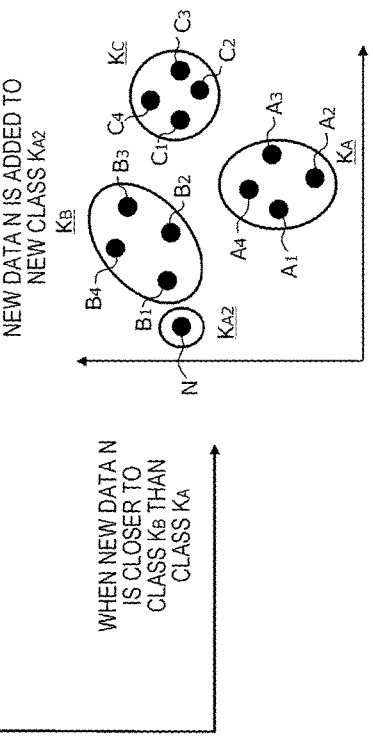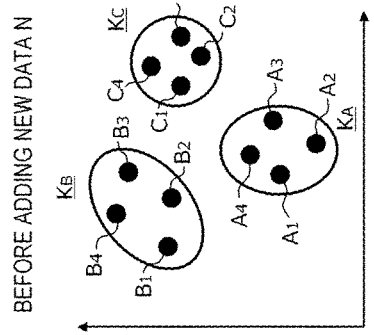

IMAGE RECOGNITION DEVICE AND METHOD FOR REGISTERING FEATURE DATA IN IMAGE RECOGNITION DEVICE

CROSS-REFERENCE TO RELATED APPLICATION

This application is based on Japanese Patent Application No. 2014-121908 filed with the Japan Patent Office on Jun. 12, 2014, the entire contents of which are incorporated herein by reference.

BACKGROUND OF THE INVENTION

Field of the Invention

The present invention relates to an image recognition device, particularly to a technology of registering feature data in the image recognition device.

Description of the Related Art

Image recognition is a technology, in which feature data is extracted from an image and a subject in the image is distinguished (identified) from others by matching the extracted feature data against feature data of a known object previously registered in a database. The image recognition is applied to various fields including personal authentication and personal identification in which a biometric image such as a face image is used, a monitoring system that detects an intruder or a suspicious substance, a workpiece inspection in a production line, and identification of a passer or a passing vehicle in a transportation infrastructure.

FIG. 8A is a view illustrating a concept of the feature data registered in the database and a class. Usually, plural features are extracted from one image, and the feature data is expressed by a multidimensional vector (referred to as a feature vector) constructed with plural features. A space formed by the feature vector is referred to as a feature space. FIG. 8A schematically illustrates the feature space. In FIG. 8A, points $A_1$ to $A_4$ indicate the feature data of an object A, points $B_1$ to $B_4$ indicate the feature data of an object B, and points $C_1$ to $C_4$ indicate the feature data of an object C. Usually, the feature data is classified in each object, and registered and managed as a batch of data set (referred to as the "class") in each object. Three classes $K_A$ to $K_C$ corresponding to the objects A to C are defined in the example of FIG. 8A.

At this point, when feature data X of an unknown object X is provided, the distinction (identification) of an object X can be regarded as a problem to determine which one of the class $K_A$ to class $K_C$ the feature data X belongs to (or not belong to). For example, a similarity between the feature data X and the feature data of each class is calculated to cause the feature data X to belong to the class having the highest similarity. In the example of FIG. 8A, because the feature data X is closest to the class $K_B$, an identification result that the object X is the object B is obtained.

Because the image photographed with a camera is used in the image recognition, the extracted feature varies inevitably depending on a photographing condition (such as an object state (in case of a face, for example, an orientation, an expression, existence or non-existence of an accessory, makeup, and a hairstyle) and a lighting state) of the time. Therefore, a method for registering plural pieces of feature data extracted from plural images having the different photographing conditions with respect to the identical object is generally adopted in order to enhance robustness against a difference of the photographing condition to improve recognition accuracy. In other words, desirably a variation of the feature data registered in the database is enhanced in order to improve the accuracy of the image recognition.

SUMMARY

However, the study of the inventors shows that sometimes the variation of the feature data degrades the accuracy of the image recognition. FIG. 8B illustrates an example. FIG. 8B illustrates the example in which feature data $A_5$ of the object A is newly added to the database in FIG. 8A. For example, when a person's face is photographed, sometimes an image similar to another person is obtained due to the expression, makeup, shading, and the like. For the use of such images, as illustrated in FIG. 8B, the feature data $A_5$ located close to pieces of feature data $B_1$ to $B_4$ of the object B is likely to be extracted although the feature data $A_5$ belongs to the object A. When the feature data $A_5$ is added to the class $K_A$, proximity or overlap between the classes $K_A$ and $K_B$ is generated on the feature space to degrade distinguishability (separability) between the two classes. For example, it is assumed that the feature data identical to the feature data X in FIG. 8A is input as the unknown object.

At this point, as illustrated in FIG. 8C, because it is unclear which one of the class $K_A$ and class $K_B$ the feature data X belongs to, there is a possibility of outputting a false identification result that the unknown object is the object A.

For example, Japanese Patent Application laid-open No. 2008-77536 discloses a method in which a structure of the database for the feature data is devised. In the method of Japanese Patent Application laid-open No. 2008-77536, the person's faces appearing in a moving image are classified, and the classified person's faces are finely classified into other classes in each face orientation of the identical person's face in constructing a person face database, thereby obtaining a better clustering result. However, because of no consideration of the distinguishability (separability) among the different objects (person faces) in the method of Japanese Patent Application laid-open No. 2008-77536, the false recognition in FIG. 8C can hardly be solved even if the method is adopted.

One or more embodiments of the present invention suppresses degradation of the distinguishability from another object when the new feature data is added to the already-registered object.

One or more embodiments of the present invention has a configuration in which, in adding the feature data having a possibility of degrading the distinguishability from another object, the feature data is registered in a class different from the class of the already-registered data.

In accordance with one or more embodiments of the present invention, an image recognition device includes: a database in which pieces of feature data of plural objects are registered while divided into classes in each object; an identification unit that identifies an unknown object by evaluating which feature data of the class registered in the database is most similar to feature data obtained from an image of the unknown object; and a feature data registration unit that registers the feature data in the database. At this point, the database can set plural classes to the identical object, and the feature data registration unit, in adding new feature data with respect to a first object already registered in the database, sets a new class other than the existing class with respect to the first object, and registers the new feature data in the new class, when a second object satisfying a predetermined similar condition with the new feature data exists in the database.

In the above configuration, in the pieces of feature data of the first object, the data similar to the second object and other pieces of data are individually classified into different classes. Therefore, compared with the setting of the single class including all the pieces of feature data of the first object, the proximity or overlap between the class of the first object and the class of the second object is hardly generated on the feature space. Accordingly, the degradation of the distinguishability between the first object and the second object (for example, a possibility of falsely recognizing the feature data of the second object as that of the first object) can be suppressed. Additionally, the variation of the feature data of the first object is enhanced by the addition of the new feature data, so that the first-object recognition accuracy can be expected to be improved.

Various conditions can be set to the "predetermined similar condition." For example, the predetermined similar condition may include a condition that "a similarity between the new feature data and feature data of a class of the second object is higher than a similarity between the new feature data and feature data of the existing class of the first object." This is because a possibility of degrading the distinguishability between the first object and the second object is enhanced when the feature data closer to the already-registered data of the second object than the already-registered data of the first object is added. The above condition may combine with a condition that "the similarity between the new feature data and the feature data of the class of the second object is higher than a threshold." This is because, for the low similarity between the new feature data and both the already-registered data of the first object and the already-registered data of the second object, there is a little influence on the distinguishability between the first object and the second object even if the new feature data is added.

Alternatively, the determination may be made by not the relative evaluations for the similarity to the already-registered data of the first object and the similarity to the already-registered data of the second object, but the simple condition that "the similarity between the new feature data and the feature data of the class of the second object is higher than the threshold." This is because a possibility of degrading the distinguishability between the first object and the second object is enhanced (irrespective of the similarity to the already-registered data of the first object) with the extremely high similarity to the second object.

The predetermined similar condition may include a condition that "a variance of the existing class increases when the new feature data is added to the existing class of the first object", or the predetermined similar condition may include a condition that "an intra-class variance of the existing class of the first object increases and an inter-class variance between the existing class of the first object and the class of the second object decreases when the new feature data is added to the existing class of the first object." Because the variance evaluates the influence of the addition of the new feature data on the whole class, the variance can be expected to obtain the more adequate result compared with the similarity.

The predetermined similar condition may be a condition that "the identification unit falsely identified that the new feature data is the feature data of the second object." This is because the degradation of the distinguishability between the first object and the second object (that is, a possibility of falsely recognizing the feature data of the second object as that of the first object) can be correctly evaluated based on whether the identification result of the identification unit is correct. The feature data registration unit may determine whether the new feature data satisfies the predetermined similar condition by asking a user whether identification result of the identification unit is correct.

In one or more embodiments of the present invention, the "object" means an image recognition target. The "object" according to one or more embodiments of the present invention may be anything, as long as the recognition can be performed using the image features. Examples of the objects include a face, a fundus, a pupil, a fingerprint, a palm print, ears, an upper half of a body, and a whole body, which are called biometric information for individual recognition of a human and an animal, and examples of the objects include a physical body and a part thereof for generic object recognition.

One or more embodiments of the present invention is an image recognition device including at least a part of the above configurations and functions, a registration device that registers the feature data in the image recognition device, or an electronic device including the image recognition device. One or more embodiments of the present invention is an image recognition method including at least a part of the above pieces of processing, a method for registering the feature data in the image recognition device, a program that causes the image recognition device (computer) to perform the method, or a non-transitory computer-readable storage medium in which the program is recorded in a non-transitory manner. One or more embodiments of the present invention includes a combination of the above configurations and pieces of processing, as long as a technical inconsistency is not generated.

In one or more embodiments of the present invention, the distinguishability from another object can be suppressed when the new feature data is added to the already-registered object.

BRIEF DESCRIPTION OF THE DRAWINGS

FIGS. 2A to 2C are views schematically illustrating examples of feature data registered in a database;

DETAILED DESCRIPTION

Hereinafter, exemplary embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. One or more of the following embodiments, by way of example, is applied to a face authentication system that identifies a human face by image recognition.

First Embodiment (System Configuration)

Figure 1:
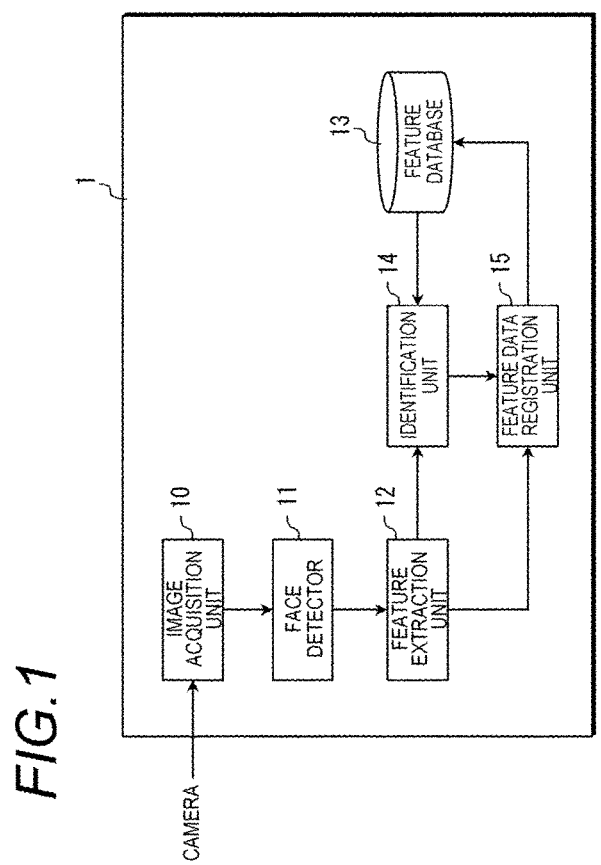
FIG. 1 is a view schematically illustrating a face authentication system according to one or more embodiments of the present invention.

FIG. 1 is a view schematically illustrating a functional configuration of a face authentication system (image recognition device) according to a first embodiment of the present invention. A face authentication system 1 performs personal authentication or personal identification of a matching target person using a face image. The personal authentication means processing (one-to-one matching) of checking whether the matching target person is a person in question, and the personal identification means processing (one-to-many matching) of identifying which registrant registered in the database is the matching target person. These face authentication technologies can be applied in various fields such as a security device in an electronic device (including a computer, a smartphone, and a tablet terminal), a monitoring system that detects an intruder, and a gate system that manages entrance and exit or controls a door key.

As illustrated in FIG. 1, the face authentication system 1 includes functional elements such as an image acquisition unit 10, a face detector 11, a feature extraction unit 12, a feature database 13, an identification unit 14, and a feature data registration unit 15. For example, the face authentication system 1 can be constructed with a computer system including hardware resources such as a processor (CPU), a memory, an auxiliary storage device, an input device, a display device, and a camera, and each functional element in FIG. 1 is implemented in a manner such that the processor executes a program to properly control the auxiliary storage device, the input device, the display device, the camera, and the like. Alternatively, all or some of the functional elements may be constructed with a dedicated chip (logic circuit). Alternatively, the face authentication system 1 can be constructed with not one computer but a combination of plural computers or cloud computing.

The image acquisition unit 10 is a function of capturing image data from a camera. The face detector 11 is a function of detecting a face from the image to specify a position and a size of the face. The image of the detected face portion is referred to as a face image. Any existing technology may be applied to face detection processing. Examples of the face detection processing include pattern matching in which texture information is used, a method for detecting the face by model fitting based on a contour or facial parts (such as eyes, a nose, and a mouth), and a method for detecting the face based on a skin color or a density distribution.

The feature extraction unit 12 is a function of extracting feature data from the face image. Any kind of feature may be used. Examples of the features include a positional relationship between feature points (such as a center and end points of the eyes, the nose, and the mouth) set in the face, a density value near the feature point or periodicity/directionality of the density value, and a color distribution. The face image itself can also be used as the feature data. The number of features can arbitrarily be set according to expected recognition accuracy. Generally, tens features to tens of thousands or more of features are extracted from one face image. It is said that a set of extracted features (referred to as the feature data or a feature vector) is obtained by quantifying the feature of the photographed face. Like the feature of the face depends on a person, there is a significant difference in feature data between persons.

The feature database 13 is a database in which information on a person who can be recognized by the face authentication system 1, and sometimes the feature database 13 is referred to as album data or dictionary data. Pieces of feature data of plural persons are classified and registered with label information (such as a personal ID or name) in the feature database 13. Depending on a face orientation, an expression, a hairstyle, makeup, a photographing time (age), and a lighting state, the feature data varies even for the identical person. Accordingly, the pieces of feature data of the plural face images in which a photographing condition, the photographing time, or the like varies for the identical person are stored in the feature database 13. Although described in detail later, plural classes can be set for the identical person in the feature database 13. FIG. 2A is a schematic diagram in which the pieces of feature data registered in the feature database 13 are mapped in a feature space. FIG. 2A illustrates an example of the pieces of feature data of three classes $K_A$, $K_B$, and $K_C$ corresponding to a person A, a person B, and a person C. For convenience, the two-dimensional feature space is illustrated in FIGS. 2A to 2C. However, the feature space having tens of dimensions to tens of thousands or more of dimensions is used in the actual system.

The identification unit 14 is a function of identifying an unknown person by comparing the pieces of feature data to each other. The feature data registration unit 15 is a function of registering the feature data in the feature database 13 according to a predetermined condition. The detailed functions will be described below together with flows of face authentication processing and data registration processing.

(Face Authentication Processing)

Figure 3:
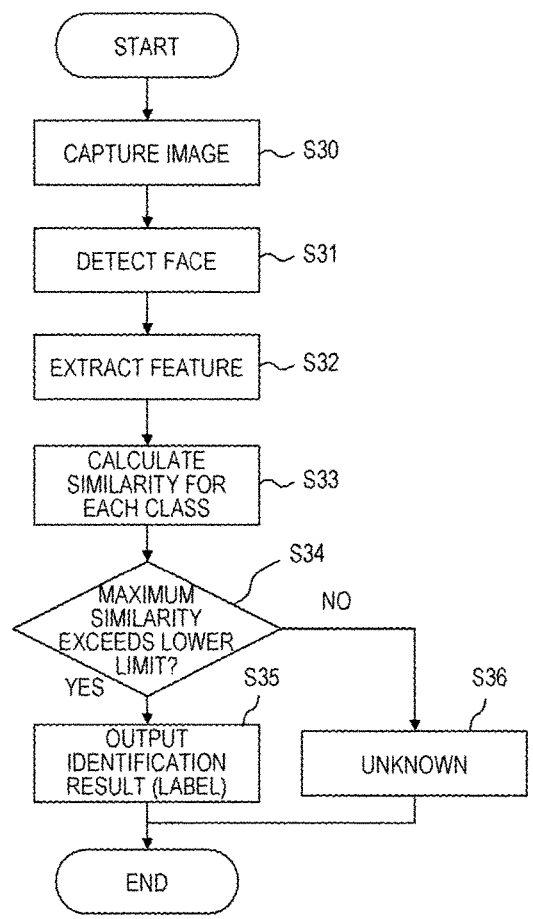
FIG. 3 is a flowchart illustrating a flow of face authentication processing.

FIG. 3 is a flowchart illustrating a flow of the face authentication processing of the face authentication system 1.

The image acquisition unit 10 captures the image of the matching target person (unknown person) from the camera (Step S30). As needed basis, the image is displayed on a display device for the purpose of user's check. The face detector 11 detects the face portion from the image (Step S31). Unless the face is detected, the image is captured again. In the case that the face is detected, the feature extraction unit 12 extracts the feature data from the image of the detected face portion (Step S32).

The identification unit 14 calculates a similarity between the feature data of matching target person, which is extracted in Step S32, and the feature data of each class (Step S33). Any index may be used as the similarity. For example, a distance (such as an Euclidean distance) or an inner product of vectors between the feature data of the matching target person and the feature data of the class on the feature space can be used as the similarity. In the case that the plural pieces of feature data exist in the class, the similarity to each piece of feature data is obtained, and a total value of the similarities or a representative value (such as a maximum value and an average) may be calculated. Alternatively, the feature data (the center of class distribution) representing the class, and the similarity to the representative feature data may be obtained. The similarity between the feature data of the matching target person and a class distribution can also be obtained using a Mahalanobis distance.

Then, the identification unit 14 selects the class indicating the maximum similarity from all the classes, and checks whether the similarity exceeds a predetermined lower limit (Step S34). When the class having the similarity exceeding the lower limit can be detected, the identification unit 14 outputs a label (such as the personal ID or name) associated with the class as an identification result (Step S35). When the class having the similarity exceeding the lower limit does not exist, the identification unit 14 outputs an identification result that the matching target person is "unknown" (Step S36).

(Data Registration Processing)

Figure 4:
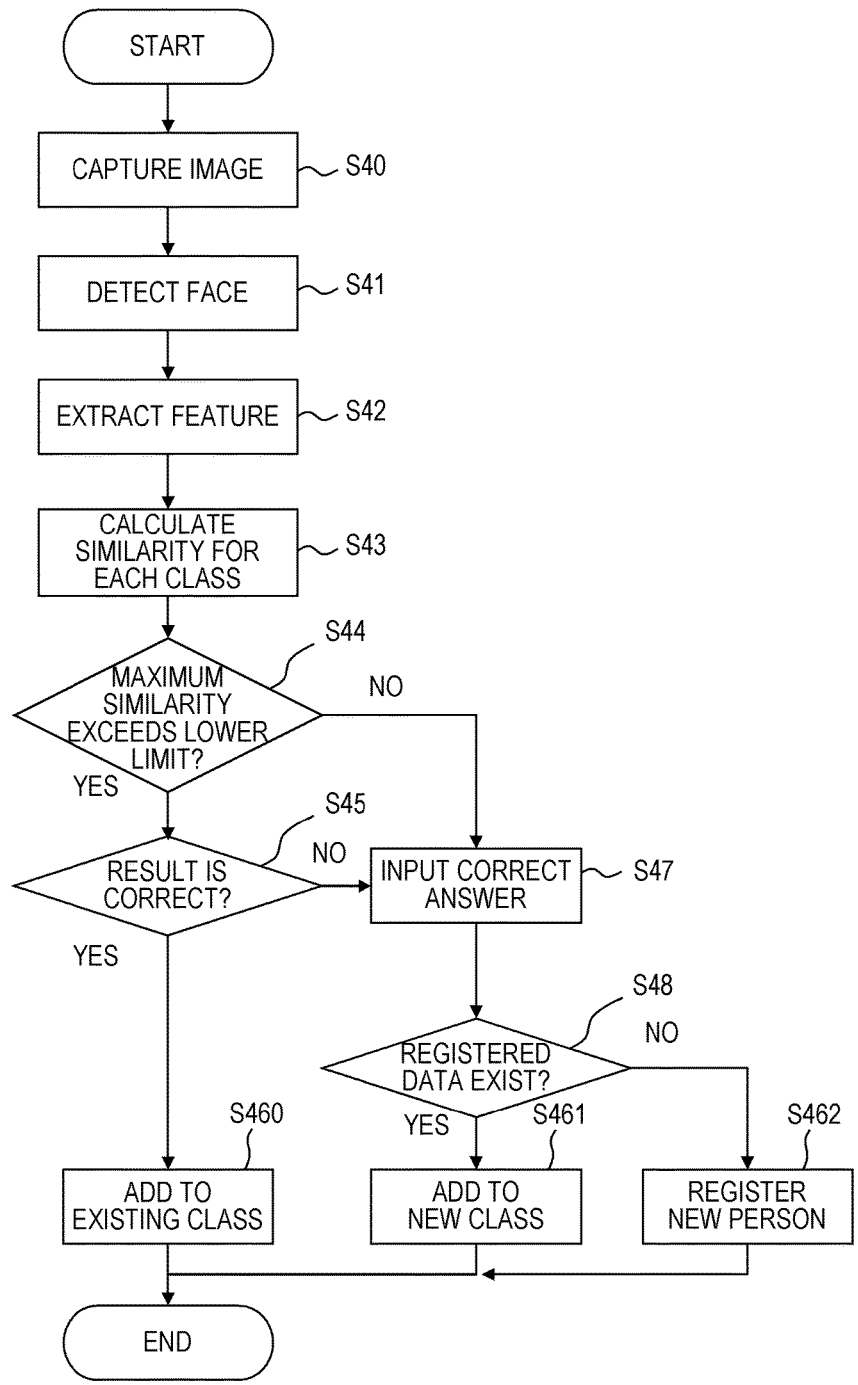
FIG. 4 is a flowchart illustrating a flow of data registration processing of the first embodiment.

Processing of registering the new feature data in the face authentication system 1 will be described below with reference to FIG. 4. FIG. 4 is a flowchart illustrating a flow of the data registration processing.

The image acquisition unit 10 captures a new registration image from the camera (Step S40). As needed basis, the image is displayed on a display device for the purpose of user's check. The face detector 11 detects the face portion from the image (Step S41). Unless the face is detected, the image is captured again. In the case that the face is detected, the feature extraction unit 12 extracts the feature data from the image of the detected face portion (Step S42). Hereinafter, the feature data extracted from the registration image is referred to as new data. The pieces of processing in Steps S40 to S42 are substantially similar to Steps S30 to S32 in the face authentication processing.

The identification unit 14 calculates the similarity between the new data extracted in Step S42 and the feature data of each class registered in the feature database 13 (Step S43). The identification unit 14 selects the class indicating the maximum similarity from all the classes, and checks whether the similarity exceeds a predetermined lower limit (Step S44). The pieces of processing in Steps S43 and S44 are substantially similar to Steps S33 and S34 in the face authentication processing.

The feature data registration unit 15 performs the following pieces of processing according to the identification result of the identification unit 14. When the class having the similarity exceeding the lower limit can be detected in Step S44, the feature data registration unit 15 asks a user whether the identification result is a correct answer (Step S45). For example, in the case that the identification result of the "person A" is obtained, the feature data registration unit 15 outputs a confirmation message such that "Do you register this person as Mr. A? YES/NO" together with the registration image captured in Step S40, and encourages the user to input an answer. When the user inputs "YES," namely, when the identification result is correct, the feature data registration unit 15 adds the new data extracted from the registration image to the class $K_A$ identical to that of the already-registered data of the person A (Step S460). FIG. 2B illustrates the feature space in the case that new data N is added to the existing class $K_A$.

The processing in the case that the identification result is incorrect will be described below. For example, it is assumed that the identification result of the "person B" is obtained although the registration image is the "person A." The false recognition is generated in the case that the similarity between the new data N and pieces of already-registered data $B_1$ to $B_4$ of the person B is higher than the similarity between the new data N and pieces of already-registered data $A_1$ to $A_4$ of the person A. Possibly the false recognition is generated in the case that the person A originally resembles the person B in looks, or in the case that the image similar to the face of the person B happens to be obtained due to the expression or face orientation during the photographing.

Similarly the feature data registration unit 15 outputs the confirmation message that "Do you register this person as Mr. B? YES/NO" together with the registration image (the image of the person A) (Step S45). In the case that the user selects "NO," the feature data registration unit 15 encourages the user to input the correct answer (Step S47). For example, the user may select a human name from a presented list of already-registered human names, or the user may input the human name. When the user informs the correct answer "person A," the feature data registration unit 15 checks whether the "person A" is a person who is already registered in the feature database 13 (Step S48). When the "person A" is the already-registered person, as illustrated in FIG. 2C, the feature data registration unit 15 sets a new class $K_{A2}$ other than the existing class $K_A$ with respect to the person A, and registers the new data N extracted from the registration image in the new class $K_{A2}$ (Step S461).

On the other hand, when the person is not the already-registered person (for example, when the registration image is an image of a person D), the feature data registration unit 15 sets a new-person class to the feature database 13, and registers the new data extracted from the registration image in the new-person class (Step S462). When the class having the similarity exceeding the lower limit cannot be detected in Step S44 (that is, when the identification result is unknown), the flow goes to Step S47, and the new data extracted from the registration image is registered as the new person.

Thus, in the data registration processing of the first embodiment, the new feature data (N) is registered in the class ($K_{A2}$) different from the already-registered data ($A_1$ to $A_4$) in the case that the similarity to the already-registered data ($B_1$ to $B_4$) of another person (B) is higher than the similarity to the already-registered data ($A_1$ to $A_4$) of the person in question (A) even in the feature data (N) of the identical person (A). Because the two classes $K_A$ and $K_{A2}$ correspond to the identical person A, the identical label information is allocated to the classes $K_A$ and $K_{A2}$.

Figure 8B:
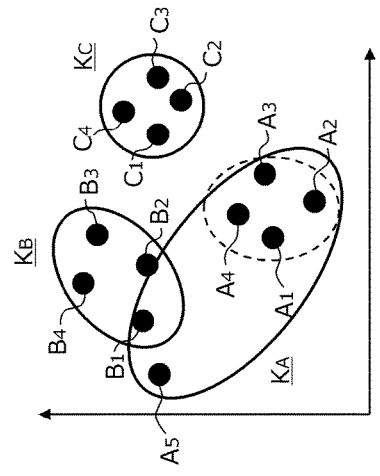
FIGS. 8A to 8C are schematic diagrams illustrating a conventional technology.
Figure 8C:
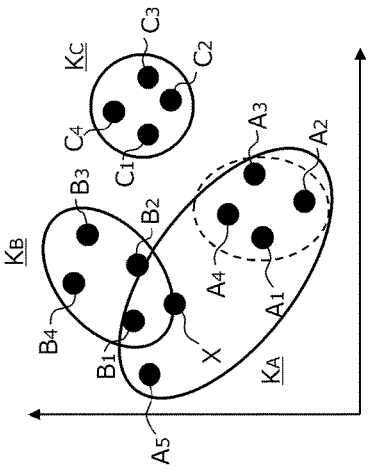
Figure 8A:
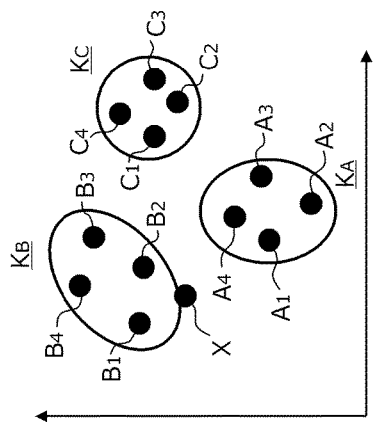

One or more of the following advantages may be obtained when the face authentication processing is performed using the feature database 13. First, compared with the setting of the single class (see FIG. 8B) including all the pieces of feature data, proximity or overlap between the classes $K_A$ and $K_{A2}$ of the person A and the class $K_B$ of the person B is hardly generated on the feature space (see FIG. 2C). Accordingly, degradation of distinguishability (separability) between the persons A and B can be suppressed in the face authentication processing. For example, the correct identification result of the "person B" can be obtained even if feature data X is input as illustrated in FIG. 8C. Second, because a variation of the feature data of the person A is enhanced, the recognition accuracy for the person A can be expected to be improved. That is, although both the feature data close to the class $K_A$ and the feature data close to the class $K_{A2}$ are possibly input in performing the face authentication of the person A depending on the photographing condition, the correct identification result of the "person A" can be obtained using the database of the first embodiment in both the cases.

The pieces of processing from Step S45 in the data registration processing of the first embodiment may be performed subsequent to the face authentication processing in FIG. 3. That is, when the face authentication processing fails (when the identification result is incorrect or unknown), automatic learning of the database can be performed by adding the new feature data to the feature database 13.

Second Embodiment

A basic thought of a second embodiment is similar to that of the first embodiment in that the new feature data is registered in the class other than the class of the already-registered data of the person in question in the case that the similarity to the already-registered data of another person is higher than the similarity to the already-registered data of the person in question. In the first embodiment, the user informs the correct label (person) in the case that the face authentication processing fails. On the other hand, in the second embodiment, the correct label information is previously input together with the registration image.

A flow of data registration processing of the second embodiment will be described with reference to a flowchart in FIG. 5. Because the system configuration and the flow of the face authentication processing are similar to those of the first embodiment, the description is omitted.

The image acquisition unit 10 captures a new registration image from the camera (Step S50). As needed basis, the image is displayed on a display device for the purpose of user's check. The face detector 11 detects the face portion from the image (Step S51). Unless the face is detected, the image is captured again. In the case that the face is detected, the feature extraction unit 12 extracts the feature data from the image of the detected face portion (Step S52).

The feature data registration unit 15 acquires label information (such as the personal ID or name) of the registration image (Step S53). For example, the user may be caused to input the ID or name with an input device such as a touch panel. The pieces of processing in Steps S50 and S53 can be replaced with processing of reading the face image data and label information from image database or the like. For example, in the case that many registration images are registered in the database through batch processing, the latter is more suitable.

Then, the feature data registration unit 15 checks whether the feature data of the person identified by the label information acquired in Step S53 exists in the feature database 13 (Step S54). When the already-registered data of the person in question does not exist (NO in Step S54), the feature data registration unit 15 sets a new-person class to the feature database 13, and registers the feature data extracted in Step S52 in the new-person class (Step S552).

When the already-registered data of the person in question exists (YES in Step S54), the feature data registration unit 15 calculates a similarity Se between the new feature data and the already-registered data of another person for each class, and obtains a maximum value $Se_{max}$ from the similarities Se (Step S56). The feature data registration unit 15 calculates a similarity Si between the new feature data and the already-registered data of the person in question (Step S57). In the case that plural person-in-question classes exist, the maximum value of the similarity Si may be obtained. In the similarities Se and Si, the same index as the similarity in the face authentication processing of the first embodiment can be used (accordingly, the function of the identification unit 14 may be used in the pieces of processing in Steps S56 and S57).

Then, the feature data registration unit 15 evaluates the similarities $Se_{max}$ and Si obtained in Steps S56 and S57 to determined whether the new feature data is closer to the already-registered data of the person in question ($Se_{max} \leq Si$) or the already-registered data of another person ($Se_{max} > Si$) (Step S58). When the new feature data is closer to the already-registered data of the person in question (YES in Step S58), the feature data registration unit 15 adds the new feature data to the same class as the already-registered data of the person in question (Step S550, see FIG. 2B). In the case that the plural person-in-question classes exist, the new feature data may be added to the class having the highest similarity. On the other hand, when the new feature data is closer to the already-registered data of another person (NO in Step S58), the feature data registration unit 15 sets the new class other than the existing person-in-question class, and registers the feature data in the new class (Step S551, see FIG. 2C).

The effect similar to that of the first embodiment may be obtained through the data registration processing of the second embodiment.

In Step S58, the addition to the existing class or the division of the class is determined based on a relative evaluation (comparison) for the similarity Si to the person in question and the similarity $Se_{max}$ to another person. Alternatively, the addition to the existing class or the division of the class may be determined as a simpler method only based on whether the similarity $Se_{max}$ to the already-registered data of another person is higher than a predetermined threshold $Th_1$ ($Se_{max} > Th_1$). This is because the degradation of the distinguishability between the person in question and another person is possibly caused (irrespective of the similarity Si to the already-registered data of the person in question) in the case that the similarity $Se_{max}$ to the already-registered data of another person is extremely high.

Alternatively, even if the similarity $Se_{max}$ to the already-registered data of another person is higher than the similarity Si to the already-registered data of the person in question, the class is not divided but the data may be added to the existing class, when the similarity $Se_{max}$ is smaller than a threshold $Th_2$ ($Si < Se_{max} < Th_2$). This is because there is a little influence on the distinguishability between the person in question and another person even if the data of the low similarity to both the person in question and another person is added.

Third Embodiment

The similarity Si to the already-registered data of the person in question and the similarity Se to the already-registered data of another person are evaluated in the first and second embodiments. In a third embodiment, a change in variance $\sigma^2$ of the already-registered data of the person in question and the similarity Se to the already-registered data of another person are evaluated to determine the addition to the existing class or the division of the class.

Figure 6:
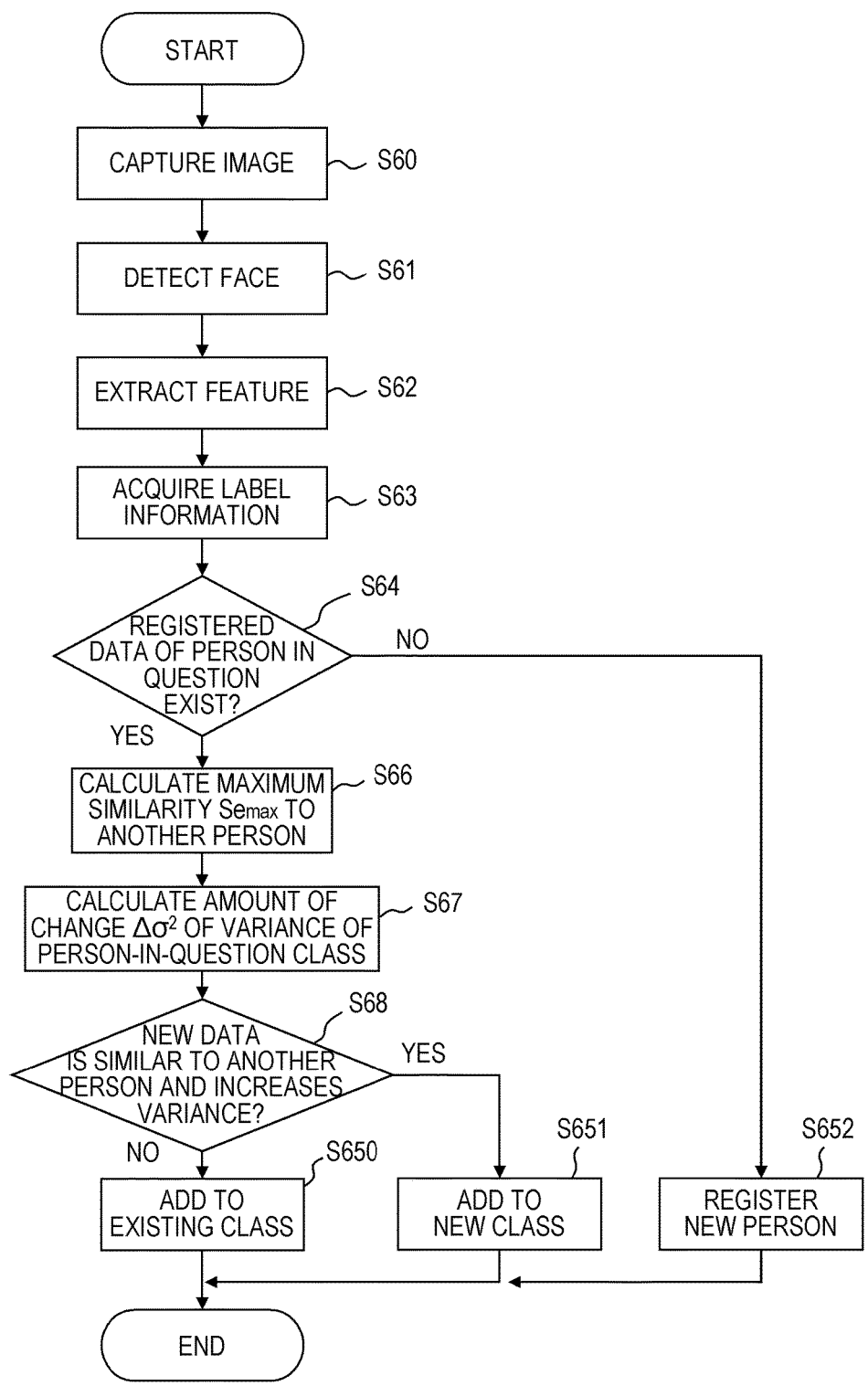
FIG. 6 is a flowchart illustrating a flow of data registration processing of a third embodiment.

A flow of data registration processing of the third embodiment will be described with reference to a flowchart in FIG. 6. Because the system configuration and the flow of the face authentication processing are similar to those of the first embodiment, the description is omitted.

Figure 5:
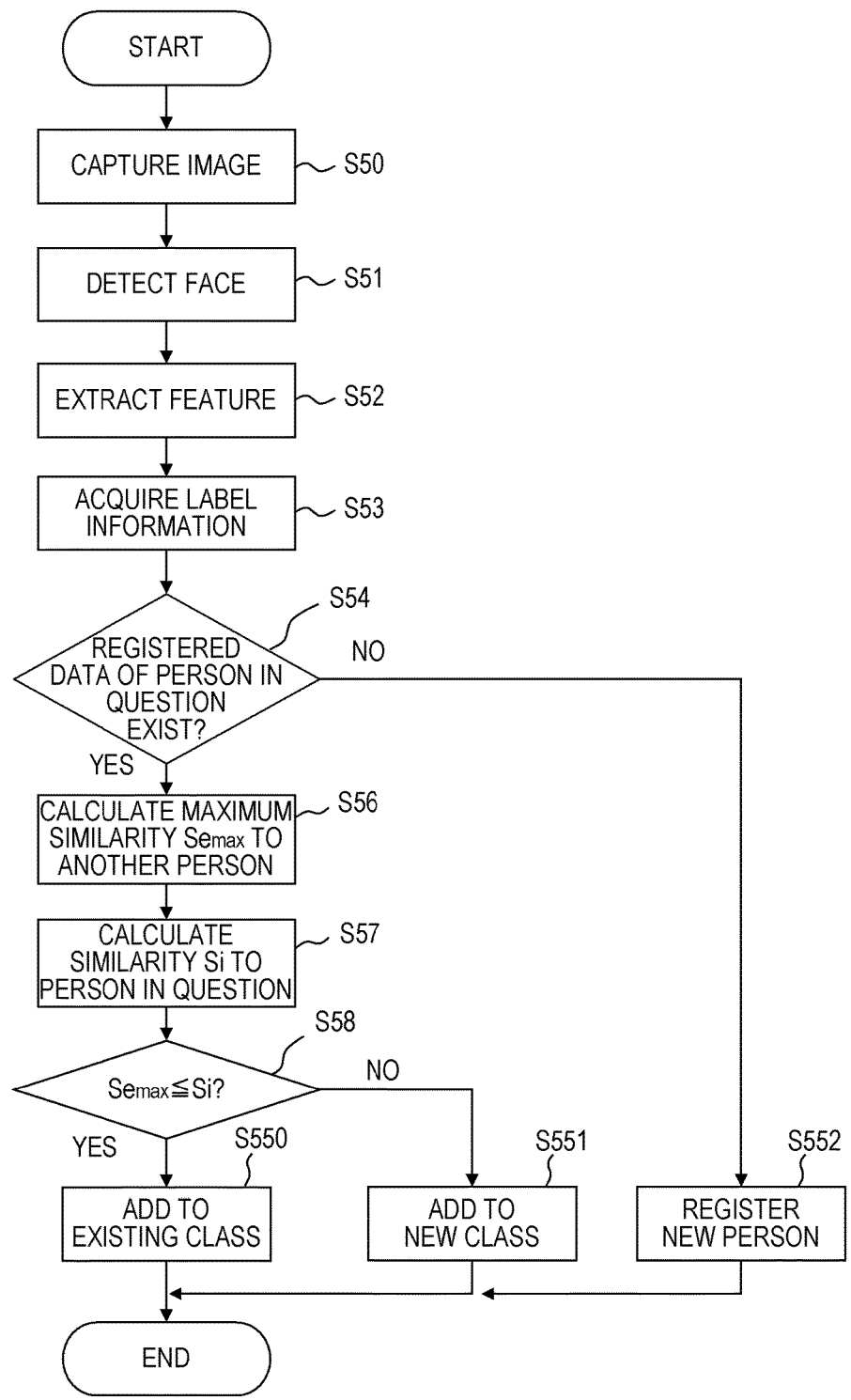
FIG. 5 is a flowchart illustrating a flow of data registration processing of a second embodiment.

The pieces of processing in Steps S60 to S64, and S652 are similar to those in Steps S50 to S54, and S552 of the second embodiment (FIG. 5).

When the already-registered data of the person in question exists (YES in Step S64), the feature data registration unit 15 calculates a similarity Se between the new feature data and the already-registered data of another person for each class and obtains a maximum value $Se_{max}$ from the similarities Se (Step S66). The processing in Step S66 is substantially similar to that in Step S56 of the second embodiment.

The feature data registration unit 15 calculates a variance $\sigma_1^2$ of the person-in-question class and a variance $\sigma_2^2$ in the case that the new feature data is added to the person-in-question class, and obtains an amount of change $\Delta\sigma^2 = \sigma_2^2 - \sigma_1^2$ of the variance (Step S67). In the case that the plural person-in-question classes exist, the minimum amount of change $\Delta\sigma^2$ of the variance may be obtained.

The feature data registration unit 15 evaluates the similarity $Se_{max}$ and the amount of change $\Delta\sigma^2$ of the variance, which are obtained in Steps S66 and S67 (Step S68). When the new feature data is extremely close to the already-registered data of another person ($Se_{max}$>threshold $Th_3$) and when the variance of the person-in-question class is increased by the addition of the new feature data ($\Delta\sigma^2$>0 or $\Delta\sigma^2$>threshold $Th_4$) (YES in Step S68), the feature data registration unit 15 sets a new class other than the existing person-in-question class, and registers the new feature data in the new class (Step S651, see FIG. 2C). On the other hand, when the already-registered data of another person similar to the new feature data does not exist ($Se_{max}$<threshold $Th_3$) or when the addition of the new feature data has a little influence on the variance of the person-in-question class ($\Delta\sigma^2$=0 or $\Delta\sigma^2$<threshold $Th_4$) (NO in Step S68), the feature data registration unit 15 adds the new feature data to the same class as the already-registered data of the person in question (Step S650, see FIG. 2B). In the case that the plural person-in-question classes exist, the new feature data may be added to the class having the smallest amount of change of the variance.

The effect similar to that of the first and second embodiments may be obtained through the data registration processing of the third embodiment.

Fourth Embodiment

The change in variance $\sigma^2$ of the already-registered data of the person in question and the similarity Se to the already-registered data of another person are evaluated in the third embodiment. In a fourth embodiment, the addition to the existing class or the division of the class is determined by evaluating changes in intra-class variance and inter-class variance before and after the addition of the new feature data.

Figure 7:
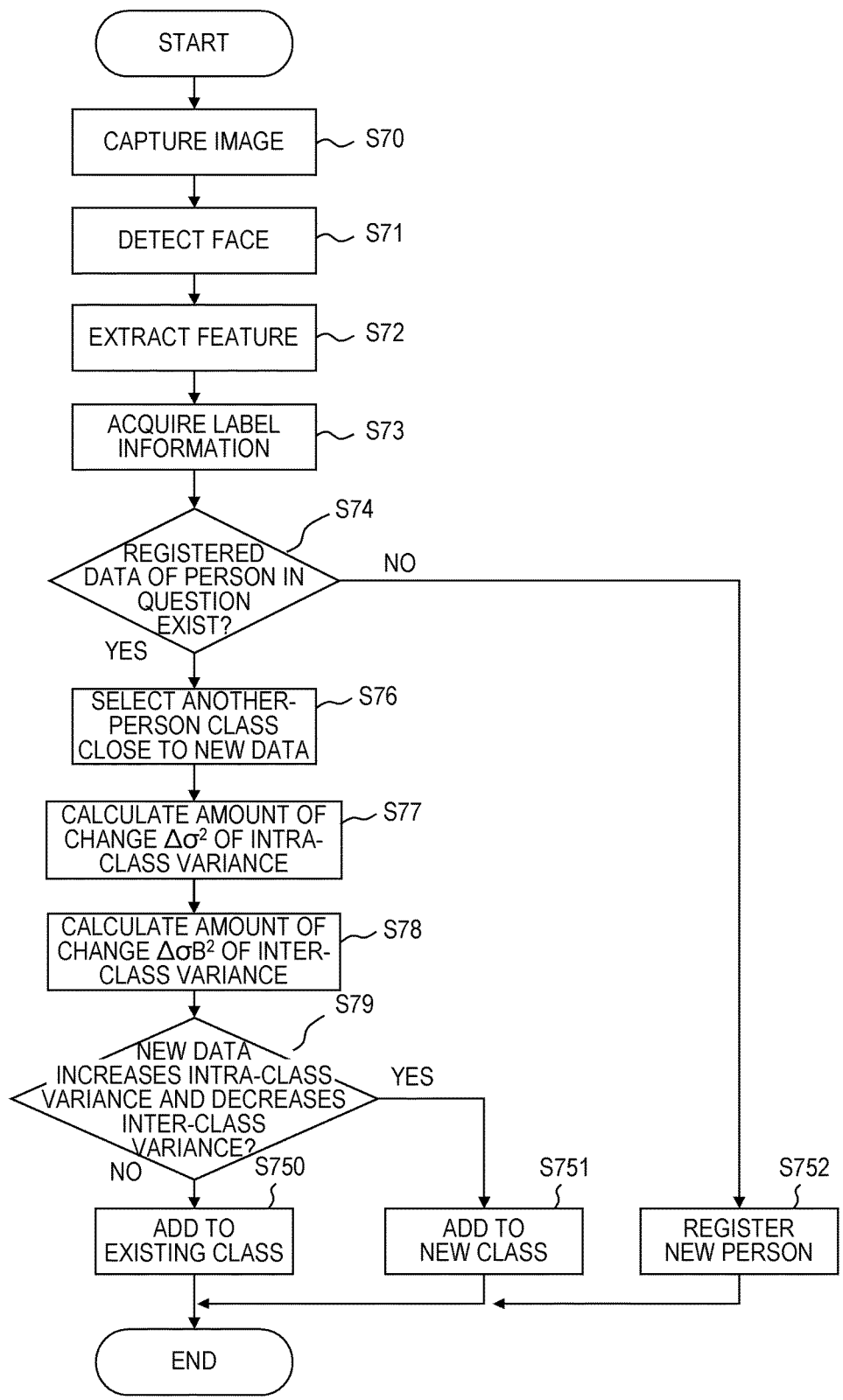
FIG. 7 is a flowchart illustrating a flow of data registration processing of a fourth embodiment.

A flow of data registration processing of the fourth embodiment will be described with reference to a flowchart in FIG. 7. Because the system configuration and the flow of the face authentication processing are similar to those of the first embodiment, the description is omitted.

The pieces of processing in Steps S70 to S74, and S752 are similar to those in Steps S50 to S54, and S552 of the second embodiment (FIG. 5).

In the case that the already-registered data of the person in question exists (YES in Step S74), the feature data registration unit 15 selects an another-person class closest to the new feature data (that is, the another-person class having the highest possibility of degrading the distinguishability between the another-person class and the person-in-question class by the addition of the new feature data) from another-person classes (Step S76). Similarly to the processing in Step S56 of the second embodiment (FIG. 5), the processing in Step S76 can be performed by obtaining the similarity between the new feature data and each class.

The feature data registration unit 15 calculates the intra-class variance $\sigma_1^2$ of the person-in-question class and the intra-class variance $\sigma_2^2$ in the case that the new feature data is added to the person-in-question class, and obtains the amount of change $\Delta\sigma^2=\sigma_2^2-\sigma_1^2$ of the variance (Step S77). In the case that the plural person-in-question classes exist, the person-in-question class with the minimum amount of change $\Delta\sigma^2$ of the variance is selected.

The feature data registration unit 15 calculates an inter-class variance $\sigma_{B1}^2$ between the person-in-question class and the another-person class (hereinafter, referred to as a target another-person class) selected in Step S86 and an inter-class variance $\sigma_{B2}^2$ between the person-in-question class and the target another-person class in the case that the new feature data is added to the person-in-question class, and obtains the amount of change $\Delta\sigma_B^2=\sigma_{B2}^2-\sigma_{B1}^2$ of the inter-class variance (Step S78).

The feature data registration unit 15 evaluates the amount of change $\Delta\sigma^2$ of the intra-class variance and the amount of change $\Delta\sigma_B^2$ of the inter-class variance, which are obtained in Steps S77 and S78 (Step S79). When the intra-class variance is increased by the addition of the new feature data ($\Delta\sigma^2$>0 or $\Delta\sigma^2$>threshold $Th_5$) and when the inter-class variance is decreased by the addition of the new feature data ($\Delta\sigma_B^2$<0 or $\Delta\sigma_B^2$<threshold $Th_6$<0) (YES in Step S79), the feature data registration unit 15 sets a new class other than the existing person-in-question class, and registers the new feature data in the new class (Step S751, see FIG. 2C). On the other hand, when the intra-class variance is not increased by the addition of the new feature data or when the inter-class variance is not decreased by the addition of the new feature data (NO in Step S79), the feature data registration unit 15 adds the new feature data to the same class as the already-registered data of the person in question (Step S750, see FIG. 2B). In the case that the plural person-in-question classes exist, the new feature data may be added to the class having the smallest amount of change of the variance.

The effect similar to that of the first and second embodiments can be obtained through the data registration processing of the fourth embodiment. Particularly, in the method of the fourth embodiment, whether the distinguishability (separability) between the person in question and another person degrades in the case that the new feature data is added to the person-in-question class can be evaluated by the direct index of the intra-class variance and the inter-class variance. Therefore, the class having an adequate size can be expected to be formed.

In Step S79 of the fourth embodiment, the change in intra-class variance and the change in inter-class variance are individually evaluated. Alternatively, a ratio (a value obtained by dividing one by the other) of the intra-class variance and the inter-class variance may be evaluated. For example, the increase of the inter-class variance and the decrease of the intra-class variance can be determined using an evaluation formula of $\sigma_2^2/\sigma_{B2}^2 < \sigma_1^2/\sigma_{B1}^2$ or $(\sigma_{B2}^2-\sigma_1^2/\sigma_{B1}^2)$<threshold $Th_7$. Similarly, the increase of the inter-class variance and the decrease of the intra-class variance can also be determined using an evaluation formula in which the numerator and the denominator are replaced with each other, namely, $\sigma_{B2}^2/\sigma_2^2 > \sigma_{B1}^2/\sigma_1^2$ or $(\sigma_{B2}^2/\sigma_2^2-\sigma_{B1}^2/\sigma_1^2)$>threshold $Th_8$.

Other Embodiments

The first to fourth embodiments are merely specific examples of the present invention, and the present invention is not limited thereto. For example, the following configurations can be adopted as embodiments of the present invention.

In the first and second embodiments, the similarity (such as the distance between the pieces of feature data) is used in the evaluation. In the third embodiment, the variance is used in the evaluation for the person-in-question class, and the similarity is used in the evaluation for the another-person class. In the fourth embodiment, the intra-class variance is used in the evaluation for the person-in-question class, and the inter-class variance is used in the evaluation for the another-person class. Alternatively, another index may be used in the evaluation. Because the similarity and the variance have different merits, the similarity and the variance may be used by a combination thereof. For example, the similarity has the merits that calculation cost is smaller than that of the variance and that the high-speed processing can be performed. The similarity also has the merits that the similarity can be used even in a small number of pieces of feature data (in other words, the variance has low reliability unless the certain number of pieces of data exists). On the other hand, the variance can be expected to obtain the more adequate result compared with the similarity (for the large number of pieces of data) because the variance evaluates the influence of the addition of the new data on the whole class. For example, in the case that the new data is located at a position significantly distant from an average of the person-in-question class, there is a high possibility of dividing the person-in-question class in the method in which the similarity is used. In the case that the person has the large variation of the feature data, possibly the class is excessively segmentalized. On the other hand, like the third embodiment, the use of the variance in the evaluation makes a determination that necessity of the division of the person-in-question class is eliminated to form the person-in-question class having the adequate size, when the small change in variance is caused by the addition of the new data even if the new data is located at the position significantly distant from the average of the person-in-question class.

In the first to fourth embodiments, the face authentication system is illustrated by way of example. However, one or more embodiments of the present invention can be applied to any image recognition device other than the face authentication system. A fundus, a pupil, a fingerprint, a palm print, ears, an upper half of a body, and a whole body can be set to the recognition target (object) in addition to the face. Not only living bodies such as a human and an animal, but also generic objects such as an industrial product, a vehicle and food can be set to the recognition target. That is, one or more embodiments of the present invention can be applied to any object that can be recognized using the image feature.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An image recognition device comprising:
a database in which feature data of a plurality of objects are registered, the feature data being divided into classes for each of the plurality of objects;
an identification unit that identifies an unknown object by evaluating which of the feature data of a class from the classes registered in the database is most similar to unknown feature data obtained from an image of the unknown object; and
a feature data registration unit that registers feature data in the database,
wherein the database is capable of setting a plurality of classes to an identical object, and
the feature data registration unit, in adding new feature data for a first object that is already registered in the database, sets a new class other than an existing class for the first object, and registers the new feature data in the new class, when a second object satisfying a predetermined similarity condition with respect to the new feature data exists in the database,
wherein the predetermined similarity condition includes at least one of:
1) a condition that a similarity between the new feature data and feature data of a class of the second object is higher than a similarity between the new feature data and feature data of the existing class of the first object,
2) a condition that an intra-class variance of the existing class of the first object increases and an inter-class variance between the existing class of the first object and the class of the second object decreases when the new feature data is added to the existing class of the first object, and
3) a condition that distinguishability, by the identification unit, between the first object and the second object is degraded when the new feature data is added to the existing class of the first object.

2. The image recognition device according to claim 1, wherein the predetermined similarity condition includes a condition that a similarity between the new feature data and feature data of the class of the second object is higher than a threshold.

3. The image recognition device according to claim 1, wherein the predetermined similarity condition includes a condition that a variance of the existing class of the first object increases when the new feature data is added to the existing class.

4. The image recognition device according to claim 1, wherein the object is a human face.

5. A method for registering feature data in an image recognition device, the image recognition device comprising:
a database in which feature data of a plurality of objects are registered, the feature data being divided into classes for each of the plurality of objects; and
an identification unit that identifies an unknown object by evaluating which of the feature data of a class from the classes registered in the database is most similar to unknown feature data obtained from an image of the unknown object,
wherein the method comprises:
acquiring, via a computer, new feature data for a first object that is already registered in the database; and
setting, via the computer, a new class other than an existing class for the first object to register the new feature data in the new class when a second object satisfying a predetermined similarity condition with respect to the new feature data exists in the database,
wherein the predetermined similarity condition includes at least one of:
1) a condition that a similarity between the new feature data and feature data of a class of the second object is higher than a similarity between the new feature data and feature data of the existing class of the first object,
2) a condition that an intra-class variance of the existing class of the first object increases and an inter-class variance between the existing class of the first object and the class of the second object decreases when the new feature data is added to the existing class of the first object, and
3) a condition that distinguishability, by the identification unit, between the first object and the second object is degraded when the new feature data is added to the existing class of the first object.

6. A non-transitory computer readable storage medium storing a program for causing a computer to perform a method for registering feature data in an image recognition device, the image recognition device comprising:

a database in which feature data of a plurality of objects are registered, the feature data being divided into classes for each of the plurality of objects; and an identification unit that identifies an unknown object by evaluating which of the feature data of a class from the classes registered in the database is most similar to unknown feature data obtained from an image of the unknown object, wherein the method comprises:

acquiring new feature data for a first object that is already registered in the database; and setting a new class other than an existing class for the first object to register the new feature data in the new class when a second object satisfying a predetermined similarity condition with respect to the new feature data exists in the database, wherein the predetermined similarity condition includes at least one of:

1) a condition that a similarity between the new feature data and feature data of a class of the second object is higher than a similarity between the new feature data and feature data of the existing class of the first object, 2) a condition that an intra-class variance of the existing class of the first object increases and an inter-class variance between the existing class of the first object and the class of the second object decreases when the new feature data is added to the existing class of the first object, and 3) a condition that distinguishability, by the identification unit, between the first object and the second object is degraded when the new feature data is added to the existing class of the first object.

* * * * *